May 23, 1967 E. K. HOWELL 3,321,641
SNAP-ACTION TRIGGER CIRCUIT FOR SEMICONDUCTOR SWITCHING DEVICES
Filed May 18, 1964 2 Sheets-Sheet 1
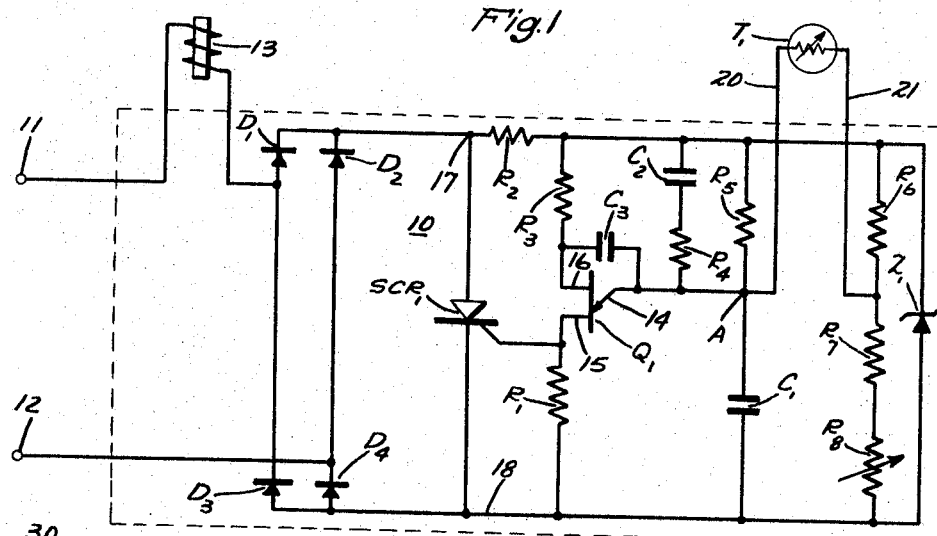
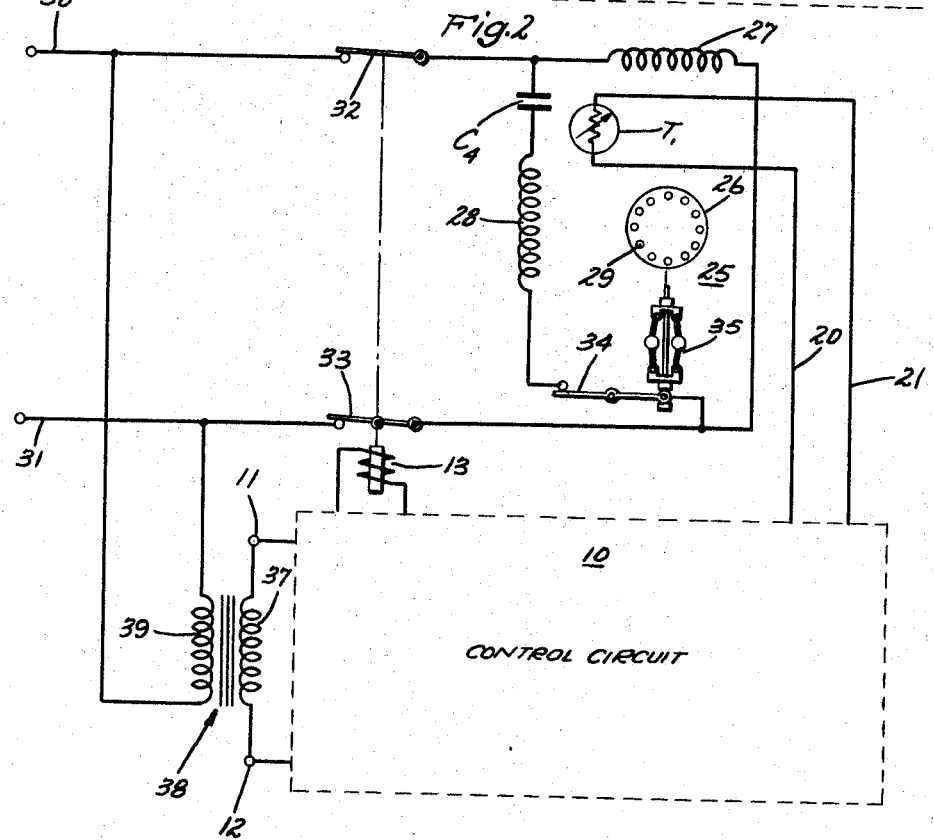
INVENTOR.
Edward K. Howell,
BY Henry J. Marcinick
Attorney.

May 23, 1967  E. K. HOWELL  3,321,641
SNAP-ACTION TRIGGER CIRCUIT FOR SEMICONDUCTOR SWITCHING DEVICES
Filed May 18, 1964  2 Sheets-Sheet 2

INVENTOR.
Edward K. Howell,
BY Henry J. Marcinick
Attorney.

United States Patent Office 3,321,641
Patented May 23, 1967

3,321,641
SNAP-ACTION TRIGGER CIRCUIT FOR SEMI-
CONDUCTOR SWITCHING DEVICES
Edward Keith Howell, Skaneateles, N.Y., assignor to General Electric Company, a corporation of New York
Filed May 18, 1964, Ser. No. 368,267
16 Claims. (Cl. 307—88.5)

This invention relates to trigger circuits for semiconductor switching devices and more particularly to such circuits for turning on and off semiconductor switching devices, such as controlled rectifiers, with a snap type of action.

In many electrical devices which are subjected to an excessive condition, such as overheating, that may damage the device, it is desirable that some sort of arrangement or system be provided to protect the device against the excessive condition. For example, when the operating temperature of an electrical device, such as a motor, exceeds a predetermined safe limit, it is frequently desirable, if not necessary, that the motor be deenergized and again reenergized when the temperature drops down to a safe value. The temperature differential between deenergization or trip condition of the circuit and the reenergization or reset condition should be preselected so that the electrical device is neither cut in too quickly nor cut off from the power supply for an unduly long period of time.

Prior art phase control circuits utilizing semiconductor devices, such as a silicon controlled rectifier triggered by a unijunction firing circuit, have been eminently successful when used for phase controlling the power supplied to a load. However, such circuits have inherent limitations when used to energize and denergize a coil actuating a contactor in response to a condition sensed by the circuit. Phase controlling the power to a relay or contactor frequently results in a vibration or chattering of the contacts of the relay. Thus, there is a need for a trigger circuit arrangement that will turn a controlled rectifier or other semiconductor switching device on an off with a positive or snap action to prevent chattering.

Specifically, in certain applications, such as motor overtemperature protector circuits, it is desirable to trigger a semiconductor switching device in response to predetermined temperature levels to energize or deenergize a main contactor coil without need for auxiliary relay contactors. When the temperature of the motor exceeds a predetermined level, the trigger circuit should switch the semiconductor switching to effect an opening of the contactor thereby to disconnect the motor from the power supply. When the motor has cooled down to a predetermined temperature, the trigger circuit should again switch the semiconductor switching device to cause the contactor thereby to close and connect the motor in circuit with the power supply. It is particularly desirable in such an application that the trigger circuit be readily adapted to provide a predetermined differential between the temperature at which the switching device is turned on and the temperature at which it is turned off.

Accordingly, it is a general object of the present invention to provide an improved snap action trigger circuit for triggering at least one semiconductor switching device in response to a condition sensed by the circuit.

Another object of the present invention is to provide an improved snap action trigger circuit for turning on a semiconductor switching device such as a controlled rectifier in response to a first condition and for switching off the device in response to a second condition.

It is a more specific object of the present invention to provide an improved trigger circuit that is adapted for use in conjunction with a semiconductor switching device used to energize and deenergize a contactor coil.

In accordance with one form of my invention, I have provided an improved trigger circuit for turning on and off a first semiconductor switching device, such as a silicon controlled rectifier or the like, with a snap type of switching action. The first semiconductor switching device is adapted for connection with a cyclically varying potential source, such as an alternating source or a rectified unidirectional source, to control the power supplied to a contactor coil. Preferably, the trigger circuit is energized from the potential source and may, for example, be connected across the first semiconductor switching device. The trigger circuit includes a timing capacitor and a second semiconductor switching device, which may be a double base diode such as a unijunction transistor.

The second semiconductor switching device is coupled with the first semiconductor switching device and the timing capacitor so that the capacitor is discharged to trigger the first device when the potential on the timing capacitor reaches a predetermined level. The trigger circuit also includes a condition responsive charging circuit having at least one potential divider network with one or more condition sensing elements, such as thermistors, to vary the potential level at a potential dividing point in response to changes in the condition. The potential dividing point may be directly coupled with the timing capacitor or may be coupled therewith through a diode.

According to an important aspect of the invention, I have provided a means for increasing the potential of the timing capacitor so that the potential on the capacitor reaches its maximum value near the start of a half cycle. Preferably, this means is comprised of a resistance-capacitance network having a predetermined time constant and causes the potential on the timing capacitor to reach its maximum value near the start of a half cycle so that a turn-on of the first switching device can be effected at the outset of a half cycle or not at all.

An important advantage resulting from the improved trigger circuit arrangement is that it is possible to provide a snap type of switching action. Also, with the improved trigger circuit arrangement a differential can be readily provided between the condition at which the semiconductor device is turned on and the condition at which it is turned off. Where the semiconductor switching device is used to deenergize and reenergize control devices such as contactor coils, vibration or chattering of the contacts actuated by the control device is effectively eliminated.

The subject matter which I regard as my invention is set forth in the appended claims. The invention itself, however, together with further objects and advantages thereof may be understood by referring to the following description taken in connection with the accompanying drawings in which:

FIGURE 1 is a schematic circuit diagram of a snap action trigger circuit illustrating one embodiment of the invention;

FIGURE 2 is a schematic circuit diagram showing the control circuit connecter for providing over temperature protection for an induction motor;

Figure 3A:
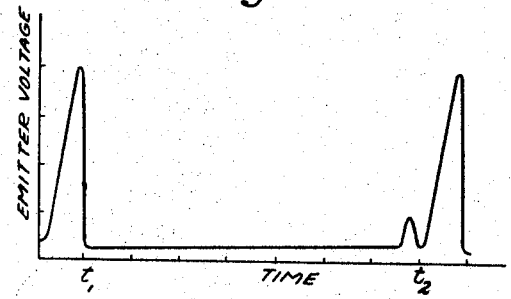
FIGURE 3a illustrates the wave form of the emitter voltage of the unijunction transistor in the switching control circuit shown in FIGURE 1, corresponding to a conducing condition of the controlled rectifier.

Having specific reference to FIGURE 1, I have illustrated an "on" and "off" control circuit identified generally by the reference numeral 10 and embodying one form of the invention. The control circuit 10 is adapted for connection to an alternating voltage source by means of a pair of input terminals 11, 12. In the illustrated embodiment of the invention the terminals 11, 12 were connected in circuit with a 24 volt alternating source (not shown). A contactor or relay coil 13 is connected in circuit with terminal 11 and one side of a full wave bridge rectifier consisting of the diodes $D_1$, $D_2$, $D_3$ and $D_4$. A semiconductor switching device $SCR_1$ is connected across the output terminals of the bridge so that when it is triggered into conduction in either the positive or the negative half cycle of the alternating voltage applied across terminals 11 and 12, the coil 13 will be energized in each half cycle to perform a desired control function. In the application of the control circuit 10 to be hereinafter more fully described, the coil 13 controlled a contactor used to connect and disconnect a motor from an alternating curent source in response to the temperature condition of the motor.

The semiconductor switching device $SCR_1$ used in the illustrated embodiment of the invention is a silicon controlled rectifier. The silicon controlled rectifier $SCR_1$ is a PNPN semiconductor having three terminals, and anode represented by the arrow symbol, a cathode represented by a line drawn through the apex of the arrow symbol and a gate represented by a diagonal line extended from the cathode. The operating characteristics of a silicon controlled rectifier are such that it conducts in a forward direction with a forward characteristic very similar to that of an ordinary rectifier when a gate signal is applied. The firing signal for the controlled rectifier $SCR_1$ is provided by triggering a unijunction transistor $Q_1$.

The unijunction transistor $Q_1$ controls the switching action of the controlled rectifier $SCR_1$. The voltage applied at the emitter terminal 14 of the unijunction transistor $Q_1$ is dependent upon the voltage across a timing capacitor $C_1$. When this voltage is below the peak point value of transistor $Q_1$, a very high resistance, essentially an open circuit, exists between the emitter and either of the bases 15, 16 of the transistor $Q_1$. When the voltage at the emitter 14 equals or exceeds the peak point voltage, the resistance from the emitter 14 to the base-one terminal 15 decreases suddenly to a very low value. It will be seen that the gate circuit for the controlled rectifier $SCR_1$ includes a resistor $R_1$ coupled with the base-one terminal 15 of the unijunction transistor $Q_1$. When the voltage on the timing capacitor $C_1$ reaches the peak point value, the electrical energy stored in the timing capacitor $C_1$ will be discharged through the emitter 14, the base-one terminal 15, and through the resistor $R_1$ to the negative side of the bridge circuit thereby impressing a sharp voltage spike or trigger pulse across the resistor $R_1$ for firing the controlled rectifier $SCR_1$. Power for the unijunction switching circuit is taken from the connections 17, 18 across the controlled rectifier $SCR_1$. A resistor $R_2$ and a Zener diode $Z_1$ limit the maximum interbase voltage of the unijunction transistor $Q_1$. The resistor $R_3$ connected with the base-two terminal 16 of the unijunction transistor $Q_1$ provides temperature compensation for the transistor.

The Zener diode $Z_1$ used in the exemplification of the invention is a semiconductor diode, preferably a silicon diode, having a predetermined reverse breakdown voltage, which in the exemplification of the invention was 8.2 volts. For voltages below the breakdown value, the Zener diode $Z_1$ acts as a rectifier and only negligibly small current can flow in the reverse direction. When the reverse voltage exceeds the breakdown value, the Zener diode presents a variable resistance and permits current to flow freely in the reverse direction with no substantial increase in voltage.

In accordance with the improved switching circuit arrangement, a capacitor $C_2$ and a resistor $R_4$ are connected in circuit with the capacitor $C_1$ in order to provide additional charging current for the timing capacitator $C_1$ at the start of each half cycle. As will hereinafter be more fully explained, an RC network or other means for causing the voltage at the emitter of the unijunction transistor $Q_1$ to reach its maximum value near the start or outset of a half cycle ensures that the controlled rectifier $SCR_1$ will fire near the start of a half cycle or not at all. It was found that this arrangement resulted in a snap type of switching action for the controlled rectifier that eliminated chattering of the contactor in applications where the controlled rectifier was used to switch the power to the contactor coil 13.

A capacitor $C_3$ is connected across the emitter 14 and base-two terminal 16 of the unijunction transistor $Q_1$ to prevent negative transients from turning the unijunction transistor on during its normally off condition. Leads 20 and 21 are brought out externally for connection to a condition sensing element $T_1$.

The condition sensing element $T_1$ is preferably a heat sensitive semiconductor device, a thermistor, which changes its resistance with a change in temperature. For use in the circuit shown in FIGURE 1, the element $T_1$ should have a negative temperature coefficient of resistance. A typical example of a temperature-resistance characteristic for a thermistor suitable for use in the control circuit is one that has a resistance of 5000 ohms at 25 degrees centigrade and 250 ohms at 125 degrees centigrade. When the temperature sensing element $T_1$ is mounted in the windings of a motor as is shown schematically in FIGURE 2, its resistance will decrease as the winding temperature increases. When the windings reach a predetermined excessive temperature, the change in the resistance presented by the thermistor $T_1$ will cause the contactor coil 13 to be deenergized and the contactor controlling the power supplied to the motor is open.

It will be seen that the thermistor $T_1$ serves as an element of a potential divider network which includes resistors $R_5$, $R_6$, $R_7$ and $R_8$. The resistance of the potential divider network is relatively low so that the timing capacitor $C_1$ charges rapidly to the voltage at point A of the network. In view of the additional charging current provided by the network comprising the serially connected capacitor $C_2$ and resistor $R_4$, the capacitor $C_1$ charges to a slightly higher voltage at the beginning of a half cycle and then decays to the voltage established by the potential divider network.

In FIGURE 2 of the drawing, I have illustrated an application of the improved on-and-off control circuit 10 wherein it is used to provide over-temperature protection for a motor 25. The motor 25 is shown schematically and is a single phase electric motor of the induction type having a rotor member 26 and a stator (not shown) which carries the main and start windings 27, 28 and is mounted concentrically about the rotor member 26. The rotor member 26 is generally made of a stack of thin laminations of magnetic material with a plurality of conductors 29 extending throughout the length of the rotor and electrically joined at each end by end rings not shown. The windings 27, 28 are energized from the supply lines 30, 31 through a contactors switch 32 and 33 operated by the coil 13. A starting switch 34 centrifugally actuated by a mechanism 35 disconnects the starting capacitor $C_4$ and winding 28 when the rotor member 26 reaches a predetermined speed. It will be noted that the condition sensing element $T_1$ is located between the main and start windings 27, 28 and is connected in circuit with the control circuit 10 by the leads 20 and 21. The terminals 11 and 12 of the control circuit 10 are connected in the circuit with a secondary winding 37 of transformer 38, the primary winding 39 of which is connected across the supply lines 30, 31.

Having reference now to FIGURES 1, 2, 3a and 3b, I will now more fully describe the operation of the control circuit 10. During normal operation of the motor 25 the contactor switches 32, 33 are closed due to the energization of the coil 13 by control circuit 10. So long as the temperature of the windings 27, 28 are at a predetermined level, the resistance of the thermistor $T_1$ will not change. The contactor switches 32, 33 will remain closed and the motor 25 will continue to be supplied power from the source. During the "on" condition of the control circuit 10 the peak voltage across the timing capacitor $C_1$ reaches the peak point voltage of the transistor $Q_1$ in each half cycle and the controlled rectifier $SCR_1$ is turned on near the start of each half cycle to keep the contactor coil 13 energized. The wave shape of the voltage at the emitter of the transistor $Q_1$ is such that it has a higher value at the beginning of each half cycle than at the end of the cycle.

Figure 3B:
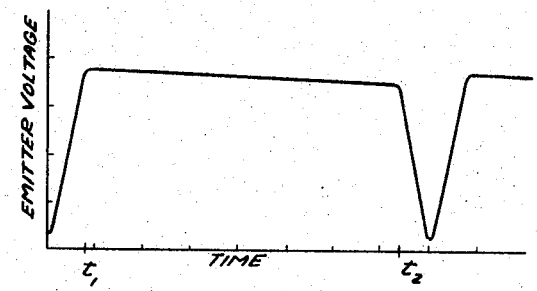
FIGURE 3b illustrates the wave form of the emitter voltage of the unijunction transistor in the switching control circuit shown in FIGURE 1, corresponding to a nonconducting condition of the controlled rectifier.

In FIGURES 3a and 3b I have illustrated the wave forms of the emitter voltage. During an arbitrary half cycle when the controlled rectifier $SCR_1$ is conducting, it will be seen from the wave form shown in FIGURE 3a that at the start of the half cycle (when the operating temperature of the motor windings 27 and 28 are normal) the voltage at the emitter of the transistor $Q_1$ rises sharply to a peak that is above the potential at the point established by the voltage divider network at the voltage dividing point A (see FIGURE 1).

At time $t_1$ the voltage on the capacitor $C_1$ reaches the peak point voltage of the unijunction transistor $Q_1$. The transistor $Q_1$ fires and causes the capacitor $C_1$ to discharge and turn-on controlled rectifier $SCR_1$. During the remainder of the half cycle when the controlled rectifier $SCR_1$ is conducting, it will be seen that only a negligible voltage is applied at the emitter 14 of the unijunction transistor $Q_1$. At the end of the half cycle $t_2$ the controlled rectifier $SCR_1$ is turned off thereby again causing the voltage divider network and the resistance-capacitance network comprised of the resistor $R_4$ and capacitor $C_2$ to be energized. The controlled rectifier $SCR_1$ continues to fire near the start of each half cycle so long as the emitter voltage rises to a value above the peak point voltage of the transistor $Q_1$.

When the potential at the voltage dividing point A contributed by the voltage divider network and the voltage superposed on the pedestal at the leading edge of the emitter wave form by the RC network is less than the peak point voltage of the unijunction transistor $Q_1$, the controlled rectifier $SCR_1$ is not fired. The wave form of the emitter voltage for this condition of the control circuit 10 is shown in FIGURE 3b. It will be seen that the emitter voltage at $t_1$ does not reach peak point value and the voltage decreases to the magnitude of the potential at the voltage dividing point A at time $t_2$.

During the nonconducting condition of the controlled rectifier $SCR_1$, it will be apparent from the voltage wave form of FIGURE 3b that the timing capacitor $C_1$ charges to a slightly higher voltage near the start of the half cycle and decays to the voltage established by the voltage divider network. As long as the peak of the voltage on the timing capacitor $C_1$ does not rise to the peak point voltage of the unijunction transistor $Q_1$, the controlled rectifier $SCR_1$ will not be triggered into conduction. During this condition of the circuit, as will be seen from the wave form, the switching circuit is continuously energized from the cyclically varying source, which was a full wave rectified source in the embodiment of the invention illustrated in FIGURE 1.

The manner in which the differential between the turn-on and turn-off conditions is obtained will now be more fully explained. The average voltage across capacitor $C_2$ is essentially equal to the average voltage of the wave form appearing across resistor $R_5$. When the unijunction transistor $Q_1$ is not conducting, the voltage waveform across resistor $R_5$ is substantially similar to that shown in FIGURE 3b. It will be understood that capacitor $C_2$ is charged during the interval from $t_1$ to $t_2$, and discharged only for a brief period between half cycles. Consequently, the average voltage on capacitor $C_2$ will be relatively large. At time $t_2$ capacitor $C_2$ is essentially fully charged and thereafter in the half cycle partially discharges as the supply voltage is going through zero. Capacitor $C_2$ begins to recharge when the supply voltage in the succeeding half cycle rises again to the level at which the capacitor $C_2$ was discharged. In the wave form shown in FIGURE 3b, the charging current for capacitor $C_2$ begins as the rising voltage approaches its maximum value, resulting in additional charging current for capacitor $C_1$ that is of a low value.

When the unijunction transistor $Q_1$ is in a conducting state, the wave form of the voltage across resistor $R_5$ is comparable to that shown in FIGURE 3a. It will be noted that the capacitor $C_2$ is now allowed to discharge during the time interval from $t_1$ to $t_2$. This results in a charging current flowing at the instant the supply voltage begins to rise after time $t_2$. Since the average voltage of this wave form is low, charging current during the voltage rise will be relatively high, and a higher charging current will be supplied to the timing capacitor $C_1$ in this condition.

At the beginning of each half cycle the charging current for capacitor $C_1$ is dependent upon the wave form during the previous half cycle, and a regenerative effect is thereby obtained. If the potential across capacitor $C_1$ reaches the peak point voltage of the unijunction transistor $Q_1$, the charging current for the capacitor $C_1$ will increase on subsequent half cycles to ensure that the transistor $Q_1$ turns on, even though divider point A remains the same. In order to effect a turn-off of the transistor $Q_1$, the potential at the voltage divider point A must be reduced to compensate for this additional charging current. Thus, a differential is provided between the turn-on and turn-off of the transistor $Q_1$. It will be understood that once the capacitor voltage does not reach the peak point voltage, the charging current will be decreased to ensure that on subsequent half cycles peak point voltage is not reached.

In the illustrative exemplification of the invention to be hereinafter more fully described, contactor 13 coil was continuously energized when the resistance of the thermistor $T_1$ was approximately 270 ohms and a turn-off of the controlled rectifier $SCR_1$ was effected when the resistance dropped to 200 ohms. In accordance with the present invention this differential between the switching conditions can be readily adjusted by changing the parameters of the RC network consisting of capacitor $C_2$ and the resistor $R_4$. This feature is particularly desirable in applications like the over-temperature protector circuit shown in FIGURE 2. In such applications it is desirable, if not necessary, to provide a suitable interval for the motor 25 to cool down before motor 25 is again energized from the power source. This cool down period can be readily provided by selecting a suitable resistance differential that corresponds to the desired temperature differential at which the motor 25 is to be turned on and off. Another important advantage of the present control circuit is that contactor chattering can be readily eliminated because of the differential between the turn-off and turn-on points.

The following circuit components are given by way of an example of a circuit that was found to perform satisfactorily in actual operation:

| | |
|---|---|
| Resistor $R_1$ ohms | 47 |
| Resistor $R_2$ do | 470 |
| Resistor $R_3$ do | 470 |
| Resistor $R_4$ do | 2200 |
| Resistor $R_5$ do | 1000 |
| Resistor $R_6$ do | 470 |
| Resistor $R_7$ do | 220 |
| Resistor $R_8$ (potentiometer) do | 500 |
| Capacitor $C_1$ microfarads | 0.1 |
| Capacitor $C_2$ do | 0.5 |
| Capacitor $C_3$ do | 0.1 |
| Zener diode $Z_1$ volts | 8.2 |
| Silicon controlled rectifier $SCR_1$ | C15F |
| Diodes $D_1$, $D_2$, $D_3$, $D_4$ | IN1692 |
| Thermistor | 2H502 |

The foregoing circuit employing the components described above provided accurate detection of thermistor resistance with an accuracy of approximately 5 percent for changes in supply voltage from 18 to 36 volts and for ambient temperatures ranging from 25 to 60 degrees centigrade.

Figure 4:
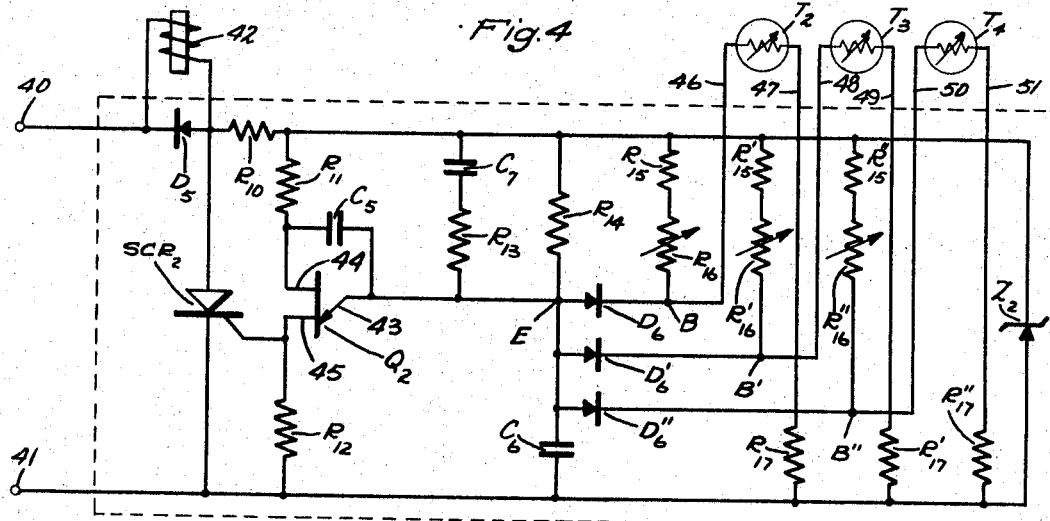
FIGURE 4 is a schematic circuit diagram of another switching circuit embodying the invention.

Turning now more specifically to FIGURE 4, I have illustrated therein a trigger circuit for switching a controlled rectifier $SCR_2$ connected across a pair of terminals 40, 41. The terminals 40, 41 are adapted for connection to a suitable low voltage alternating source. When the controlled rectifier $SCR_2$ conducts, a contactor coil 42 is energized to actuate a relay or other control device. A free wheeling diode $D_5$ is connected across the contactor coil 42 to provide a path for the inductive energy stored in the coil 42 when the controlled rectifier $SCR_2$ is switched off. With the network consisting of the resistor $R_{10}$ and the Zener diode $Z_2$, a clipped voltage is applied across the unijunction transistor $Q_2$. A capacitor $C_5$ is connected across the emitter 43 and base-two terminal 44 of the unijunction transistor $Q_2$ to prevent negative transients from triggering the unijunction transistor $Q_2$ during its off condition. A resistor $R_{11}$ is connected with the base-two terminal 44 to provide for temperature stabilization of the unijunction transistor $Q_2$. A resistor $R_{12}$ is included in the gate control circuit which couples the base-one terminal 45 with the gate-cathode junction of the controlled rectifier $SCR_2$. A timing capacitor $C_6$ is connected across the emitter 43 and base-one terminal of the unijunction transistor $Q_2$ so that when the voltage on the timing capacitor $C_6$ reaches the peak point voltage of the unijunction transistor $Q_{27}$, the capacitor $C_6$ is discharged through the resistor $R_{12}$ to provide a positive pulse at the gate of the controlled rectifier $SCR_2$.

In accordance with the improved arrangement, a peaking circuit consisting of a resistance-capacitance network comprised of the capacitor $C_7$ and the resistor $R_{13}$ is connected between the emitter 43 of the unijunction transistor $Q_2$ and the point 52, and in circuit with the timing capacitor $C_6$. A resistor $R_{14}$ is connected in series with the timing capacitor $C_6$ to provide a fixed potential across the capacitor $C_6$. Under normal conditions the potential at point E when combined with the low voltage peak introduced by the peaking circuit is sufficient to cause the voltage at the emitter 43 of the unijunction transistor $Q_2$ to reach its peak point value near the start of a half cycle.

It will be noted that in the circuit shown in FIGURE 4, leads 46, 47, 48, 49, 50 and 51 are brought out from the circuit for connection to three thermistors $T_2$, $T_3$ and $T_4$. The thermistors $T_2$, $T_3$ and $T_4$ form a part of three voltage dividing networks. One voltage dividing network includes the resistors $R_{15}$, $R_{16}$, and $R_{17}$ and voltage dividing point B connected through a diode $D_6$ to point E. The corresponding parts of the other parallel voltage divider networks are identified in the drawing with single and double primed reference symbols. The thermistors $T_2$, $T_3$ and $T_4$ are negative temperature coefficient devices.

In the embodiment of the invention illustrated in FIGURE 4, the resistors $R_{17}$, $R'_{17}$ and $R''_{17}$ are used to provide a predetermined operating differential. The resistors $R_{15}$, $R'_{15}$, $R''_{15}$ are used to bring the potentiometers $R_{16}$, $R'_{16}$ and $R''_{16}$ within calibration range. Although only three thermistors $T_2$, $T_3$ and $T_4$ are used in the circuit of FIGURE 4, it will be appreciated that additional thermistors may be added, if desired, by placing them in additional parallel voltage divider networks and connecting the voltage dividing points with point E through diodes.

With the terminals 40, 41 connected to a suitable alternating current source, the voltage across the timing capacitor under normal temperature conditions, will rise very early in the cycle to the peak emitter voltage of the unijunction transistor $Q_2$ and the controlled rectifier $SCR_2$ will be fired in each alternate half cycle of the alternating source. Let us assume that the resistance presented by the thermistor $T_2$ decreases due to a temperature increase and causes the potential at point B to be less positive than the potential at point E. The diode $D_6$ now conducts. When this occurs, the pedestal of the waveform of the voltage applied at the emitter 43 of the unijunction transistor $Q_2$ is lowered. When the emitter voltage in a given half cycle falls below the peak point voltage of the unijunction transistor $Q_2$, the transistor $Q_2$ does not fire. The controlled rectifier $SCR_1$ is in a blocking state. When the resistance of the thermistor $T_2$ returns to a level at which the potential at point B will be positive with respect to the potential at point E, the diode $D_6$ will be reversed biased, and the controlled rectifier $SCR_1$ is again repetitively fired to energize the contactor coil 42.

Figure 5:
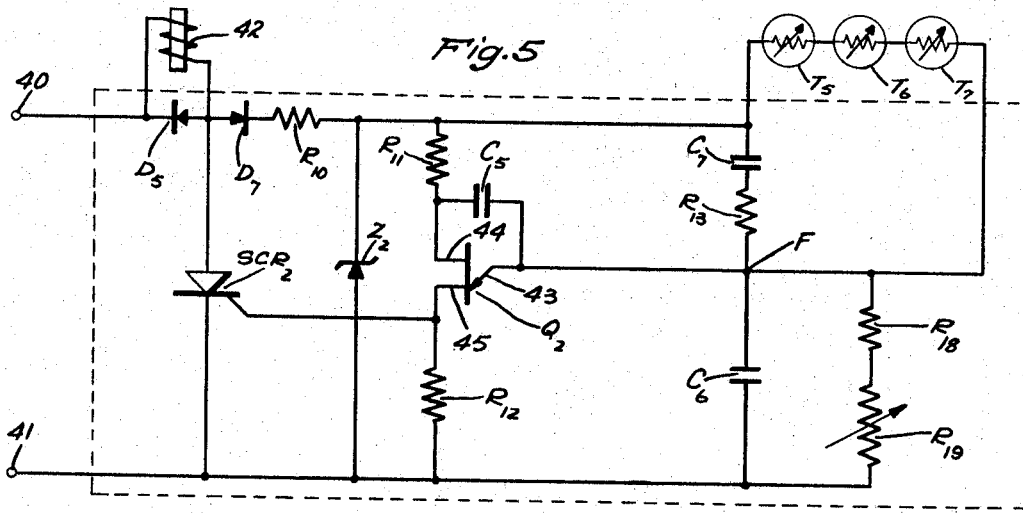
FIGURE 5 is a schematic circuit diagram of a switching circuit illustrating a modification of the circuit shown in FIGURE 4 wherein thermistors having a positive temperature coefficient are utilized as sensing element.

Turning now to the schematic circuit diagram shown in FIGURE 5, I have illustrated therein a modification of the circuit shown in FIGURE 4 wherein thermistors $T_5$, $T_6$ and $T_7$ having a positive temperature coefficient are used as sensing elements. The thermistors $T_5$, $T_6$ and $T_7$ are serially connected as shown. Since the components of this circuit as shown in FIGURE 5 are essentially the same as the components used in the components of FIGURE 4, I have used identical reference symbols to identify the corresponding parts of two circuits.

A diode $D_7$ has been provided in series with resistor $R_{10}$ and is poled so that the unijunction transistor $Q_2$ is energized only in the half cycle during which the controlled rectifier $SCR_2$ is forward biased. A fixed resistor $R_{18}$ is used in conjunction with a variable resistor $R_{19}$ to permit calibration of the circuit within the desired range. As the temperature sensed by the thermistors $T_5$, $T_6$ and $T_7$ increases, the potential at the voltage dividing point F decreases. As a result, the leading pedestal of the voltage wave form on the capacitor $C_6$ decreases. When the pedestal of the capacitor voltage wave form decreases to a point where it is less than the peak point voltage of the unijunction transistor $Q_2$, the transistor $Q_2$ does not fire to turn on the controlled rectifier $SCR_2$.

From the foregoing description of the various embodiments of the invention, it will be seen that an improved trigger circuit arrangement is provided for semiconductor switching devices, such as a solid state controlled rectifier wherein the device is switched on and off with a snap action in response to a condition sensed by the circuit. An important advantage of the improved arrangement is that it is possible to use a semiconductor switching device to energize and deenergize a contactor coil without contactor chattering and to provide a predetermined differential between the turn-off and turn-on of the devices.

Although the present invention has been described by reference to a preferred embodiment thereof, it is to be understood that many modifications may be made by those skilled in the art without actually departing from the invention. It is therefore intended by the appended claims to cover all such modifications that fall within the true spirit and scope of the invention.

What I claim as new and desire to secure by Letters Patent of the United States is:

1. A trigger circuit for turning a first semiconductor switching device on and off, said trigger circuit comprising: input means for connection with a cyclically varying potential source, a timing capacitor, a second semiconductor switching device coupled to said first semiconductor switching device and said input means thereby being synchronized with the potential source for periodically discharging the timing capacitor to effect a turn on of the first semiconductor switching device when the potential on said timing capacitor reaches a predetermined level, a condition responsive charging circuit means connected with said input means for applying a potential across said timing capacitor, said condition responsive circuit means including at least one potential dividing network having a potential dividing point connected in circuit with the timing capacitor, said potential dividing network being connected with at least one condition sensing element coupled in circuit with the potential dividing point to vary the potential at said potential dividing point in response to the condition sensed by said condition sensing element, and peaking circuit means connected in circuit with said timing capacitor for increasing the potential applied across the capacitor by said condition responsive charging circuit means near the start of a half cycle whereby the potential across the capacitor reaches its maximum value near the start of a half cycle to turn on the first semiconductor switching device only near the start of a half cycle or not at all thereby providing a snap type of switching action.

2. The trigger circuit set forth in claim 1 wherein said potential dividing point is connected in circuit with said timing capacitor through a diode, said diode being poled to divert current from said timing capacitor; and wherein an impedance element is connected in circuit with said timing capacitor and input means to cause the potential on said capacitor to rise to said predetermined level early in each half cycle unless current is diverted therefrom.

3. A trigger circuit for tuning on a semiconductor controlled rectifier of a type having an anode, cathode and gate electrode, said anode and cathode electrodes connected in circuit with a cyclically varying potential source, and said trigger circuit comprising: input means including leads for connection with the cyclically varying potential source, a double base diode means having a base-one, a base-two and an emitter electrode, means connecting said base-one and base-two electrodes across said input means, a timing capacitor connected in circuit with the emitter electrode and base-one electrodes of said double base diode, a potential dividing means connected across said input means and having a potential dividing point connected in circuit with said capacitor for applying a potential across the timing capacitor and having a relatively low impedance to allow said timing capacitor to charge to the potential at said potential dividing point near the start of a half cycle, said potential dividing means including leads for connection with at least one sensing element for varying the potential at said potential dividing point in response to a condition sensed by said sensing element, and peaking circuit means connected in circuit with said timing capacitor for causing the potential at said potential dividing point to reach its maximum value in a half cycle near the start thereof to insure that the semiconductor controlled rectifier is turned on at the start of a half cycle or not at all thereby providing snap type of switching of the semiconductor controlled rectifier.

4. The trigger circuit set forth in claim 3 wherein said potential dividing point is connected in circuit with said timing capacitor through a diode, said diode being poled to divert current from said timing capacitor; and wherein an impedance means is connected in circuit with said timing capacitor and input means to cause the potential on said capacitor to rise to said predetermined level early in each half cycle unless current is diverted therefrom.

5. A snap-action trigger circuit for effecting a turn-on and turn-off of a semiconductor controlled rectifier of the type having an anode, a cathode and a gate electrode, said anode and cathode electrodes of said semiconductor controlled rectifier connected in circuit with a cyclically varying potential source, said trigger circuit comprising: input means for connection with the cyclically varying potential source, a timing capacitor, a charging circuit means connected with said input means for applying a potential on said timing capacitor, said charging circuit means including at least one potential divider network having a potential dividing point connected in circuit with the timing capacitor, said potential dividing network including leads for connection with at least one sensing element coupled in circuit with the potential dividing point to vary the potential at said potential dividing point in response to the condition sensed by said sensing element, a semiconductor switching device synchronized with the potential source for discharging the timing capacitor to effect a turn-on of the semiconductor controlled rectifier when the potential across the timing capacitor reaches a predetermined level, and means for increasing the potential applied across the timing capacitor by said charging circuit means so that the potential across the timing capacitor reaches its maximum value near the start of each half cycle and the semiconductor controlled rectifier is turned on only near the start of a half cycle or not at all thereby to provide a snap type of switching action.

6. A snap-action trigger circuit for turning on a first semiconductor switching device connected in circuit with a cyclically varying potential source, said trigger circuit comprising: input means for connection with the potential source, a timing capacitor, a second semiconductor switching device coupled with the first semiconductor device and timing capacitor for discharging the timing capacitor to effect the turn-on of the first semiconductor switching device in response to a predetermined potential level on said capacitor, charging circuit means for supplying said timing capacitor with unidirectional half cycles of potential to charge said timing capacitor, said means including a potential divider network having a potential dividing point connected in circuit with said timing capacitor, said potential divider network including leads for connection in electrical circuit with at least one sensing element for sensing a condition and for varying the potential at said potential dividing point in response to the condition, and a resistance-capacitance network coupled with said timing capacitor for increasing the potential across said capacitor near the start of each half cycle so that the instantaneous magnitude of the potential applied across the capacitor reaches its maximum value near the start of each half cycle and causes the first semiconductor switching device to be turned on near the start of a half cycle or not at all thereby to provide a snap type of switching action.

7. A trigger circuit for turning on and off a first semiconductor switching device connected in circuit with a cyclically varying potential source, said trigger circuit comprising: input means for connection with the potential source, a timing capacitor, a second semiconductor switching device coupled with the first semiconductor device and said timing capacitor for discharging the capacitor to effect a turn-on of the first semiconductor switching device in response to a predetermined potential level on said capacitor, charging circuit means for controlling potential on said timing capacitor, said charging circuit means including a potential divider network having a potential dividing point connected in circuit with said timing capacitor, said potential divider network further including at least one sensing element having a negative temperature coefficient and connected in circuit with said potential dividing point for varying the potential at said point in response to the temperature sensed by said element, and a peaking circuit network for increasing the potential applied across the timing capacitor by said charging circuit means near the start of each half cycle whereby the potential on the timing capacitor reaches its maximum value near the start of each half cycle to turn on the first semiconductor switching device only near the start of a half cycle or not at all thereby to provide a snap type of triggering action.

8. The trigger circuit set forth in claim 7 wherein said potential dividing point is connected in circuit with said timing capacitor through a diode, said diode being poled to divert current from said timing capacitor; and wherein an impedance element is connected in circuit with said timing capacitor and input means to cause the potential on said timing capacitor to reach said predetermined level early in a half cycle unless current is diverted from said timing capacitor.

9. A trigger circuit for turning on and off a first semiconductor switching device connected in circuit with a cyclically varying potential source, said trigger circuit comprising: in put means for connection with the potential source, a timing capacitor, a second semiconductor switching device coupled with the first semiconductor device and timing capacitor for discharging the capacitor to effect a turn-on of the first semiconductor switching device in response to a predetermined potential level on said timing capacitor, charging circuit means connected in circuit with said input means for controlling the potential of said capacitor, said charging circuit means including a potential divider network havng a potential dividing point, a diode means connecting said potential dividing point in circuit with said capacitor, said potential dividing network also including at least one condition sensing element to cause the potential at the potential dividing point to vary in response to said condition and to bias said diode means into conduction when the potential at said potential dividing point reaches a predetermined level thereby to cause charging current to be diverted from the timing capacitor and effect a turn-off of the first semiconductor switching device, and means for increasing the potential on said timing capacitor so that the potential across the timing capacitor reaches its maximum value near the start of a half cycle to effect a turn on of the first semi-conductor switching only near the start of a half cycle or not at all thereby providing a snap type of switching action.

10. A snap-action trigger circuit for turning on and off a semiconductor controlled rectifier of the type having an anode, a cathode and a gate electrode, said anode and cathode connected in circuit with a cyclically varying potential source, said trigger circuit comprising: input means for connection across the semiconductor controlled rectifier, a unijunction transistor connected across the input means and having a base-one, a base-two and an emitter electrode, circuit means for coupling the base-one electrode across the gate and cathode of the semiconductor controlled rectifier, a timing capacitor connected across the emitter and base-one electrode of the unijunction transistor, said unijunction transistor being switched on to discharge said timing capacitor when the potential on said timing capacitor reaches a predetermined livel, condition responsive means for charging said timing capacitor to a potential level determined by at least one condition sensing element, and a resistance capacitance network connected across the emitter and base-two electrodes of said unijunction transistor to cause the potential at the emitter electrode to reach its maximum value near the start of each half cycle to effect a turn-on of the semiconductor controlled rectifier near the start of a half cycle or not at all thereby providing a snap type of switching action.

11. The snap-action trigger circuit set forth in claim 10 wherein the potential level of said timing capacitor is determined by a plurality of serially connected condition sensing elements having a positive temperature coefficient.

12. A trigger circuit for turning on and off a first semiconductor switching device, said trigger circuit comprising: input means for connection with a cyclically varying potential source, a timing capacitor, a second semiconductor switching device coupled with the first semiconductor device and timing capacitor for discharging the capacitor to effect a turn-on of the first semiconductor device in response to the potential level on said timing capacitor, condition responsive means connected in circuit with said input means for controlling the potential on said timing capacitor, and means coupled with said timing capacitor for supplying said timing capacitor with a pulse of current early in each half cycle thereby to cause the first semiconductor switching device to be turned on only in the early portion of the half cycle or not at all thereby effecting a snap type of triggering action.

13. A snap-action trigger circuit for turning on and off a semiconductor controlled rectifier of the type having an anode, a cathode and a gate electrode, said anode and cathode of said semiconductor controlled rectifier being connected in circuit with a cyclically varying potential source, said trigger circuit comprising: input means including leads for energizing the circuit from the potential across the semiconductor controlled rectifier, a timing capacitor, a unijunction transistor having a base-one, a base-two and emitter electrodes, said base-one and base-two electrodes connected in circuit across said input means, circuit means coupling said timing capacitor in circuit with the emitter electrode and the base-one electrode of said unijunction transistor and coupling said base-one electrode in circuit with the cathode and gate electrodes of the semiconductor controlled rectifier so that a turn-on of the semiconductor controlled rectifier is effected when the potential on the timing capacitor reaches a predetermined level, charging circuit means connected in circuit with said input means for applying a potential on said timing capacitor, said charging circuit means including at least one potental dividing network having a potential dividing point connected in circuit with the timing capacitor, said potential dividing network including at least one thermistor coupled in circuit with the potential dividing point to vary the potential at said point in response to temperature levels, and peaking circuit means for increasing the potential across the timing capacitor so that the potential across the capacitor reaches its maximum value near the start of half cycle to effect the turn-on of the semiconductor controlled rectifier only near the start of a half cycle or not at all thereby providing a snap type of switching action.

14. A snap-action trigger circuit for turning on and off a first semiconductor switching device connected in circuit with a cyclically varying potential source, said trigger circuit comprising: in put means for connection with the potential source, a timing capacitor, a second semiconductor switching device coupled with the first semiconductor switching device and said timing capacitor for discharging the capacitor to effect a turn-on of the first semiconductor switching device in response to a predetermined potential level on said timing capacitor, a charging circuit means connected in circuit with said input means for applying a potential on said capacitor, said charging circuit means including a potential divider network having a potential dividing point connected in circuit with said timing capacitor, said potential divider network including at least one temperature sensing element having a positive temperature coefficient and connected in circuit with the potential dividing point for varying the potential at said point in response to the temperature sensed by said element, and peaking circuit means for increasing the potential applied across the timing capacitor by said charging circuit means near the start of each half cycle whereby the potential across the capacitor reaches its maximum value near the start of the half cycle to effect a turn-on of the first semiconductor device only near the start of the half cycle or not at all thereby to provide a snap type of switching action.

15. A trigger circuit for turning on and off a first semiconductor switching device connected in circuit with a cyclically varying potential source, said trigger circuit comprising: input means for connection with the potential source, a timing capacitor, a second semiconductor switching device coupled with the first semiconductor device and timing capacitor for discharging the capacitor to effect a turn-on of the first semiconductor switching device in response to a predetermined potential level on said timing capacitor, charging circuit means connected in circuit with said input means for controlling the potential of said capacitor, said charging means including a potential divider network having a potential dividing point, a diode means connecting said potential dividing point in circuit with said capacitor, said potential dividing network also including at least one condition sensing element to cause the potential at the potential dividing point to vary in response to said condition and to bias said diode means into conduction when the potential at said potential dividing point reaches a predetermined level thereby to cause charging current to be diverted from the timing capacitor and effect a turn-off of the first semiconductor switching device, and means for increasing the potential on said timing capacitor so that the potential across the timing capacitor reaches its maximum value near the start of a half cycle to effect a turn-on of the first semiconductor switching only near the start of a half cycle or not at all thereby providing a snap type of switching action, said means for increasing the potential on said timing capacitor comprising a resistant-capacitance network having a time-constant such that the timing capacitor will be supplied with a pulse of current early in each half cycle.

16. A trigger circuit for turning on and off a first semiconductor switching device, said trigger circuit comprising: input means for connection with a cyclically varying potential source, a timing capacitor, a second semiconductor switching device coupled with the first semiconductor device and timing capacitor for discharging the capacitor to effect a turn-on of the first semiconductor device in response to the potential level on said timing capacitor, condition responsive means connected in circuit with said input means for controlling the potential on said timing capacitor, and means coupled with said timing capacitor for increasing the potential supplied by said condition responsive charging circuit means near the start of each half cycle thereby to cause the first semiconductor switching device to be turned on only in the early portion of the half cycle or not at all thereby effecting a snap type of triggering action, said means coupled with said timing capacitor comprising a resistance-capacitance network having a time constant such that a pulse of current is supplied to the timing capacitor early in each half cycle.

References Cited by the Examiner

UNITED STATES PATENTS 3,131,545  5/1964  Gross et al.
3,225,280  12/1965  Happe et al.
3,235,711  2/1966  Bergen et al.

ARTHUR GAUSS, *Primary Examiner.*

J. JORDAN, *Assistant Examiner.*